UNITED STATES PATENT OFFICE.

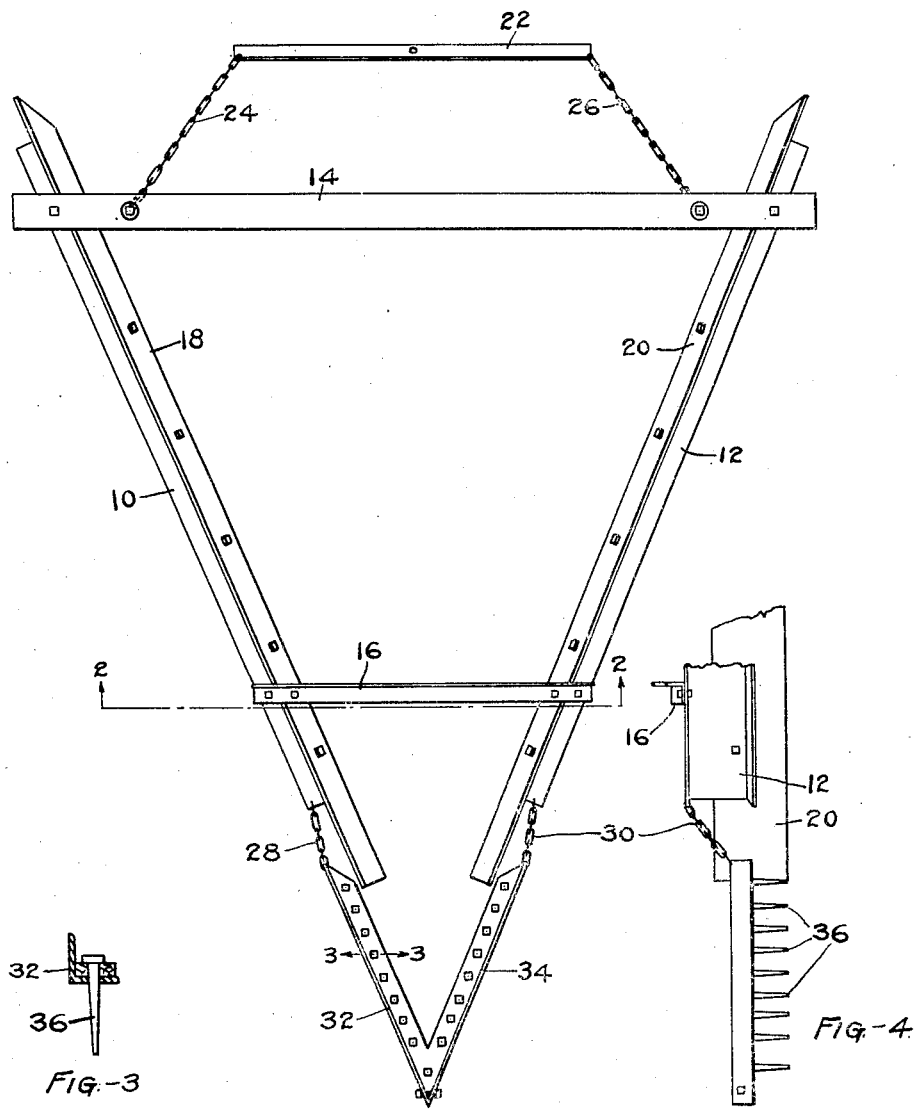

GLENN H. ALLYN, OF MADISON LAKE, MINNESOTA.

ROAD-DRAG.

1,347,485.  Specification of Letters Patent.  Patented July 27, 1920.

Application filed August 2, 1919. Serial No. 314,922.

*To all whom it may concern:*

Be it known that I, GLENN H. ALLYN, a citizen of the United States, residing at Madison Lake, in the county of Blue Earth and State of Minnesota, have invented certain new and useful Improvements in Road-Drags, of which the following is a specification.

My invention relates to road drags and an object is to provide a device of this character which is strong, durable and easy to manufacture and at the same time is efficient in placing the surfaces of roads in good condition for travel thereover.

The full objects and advantages of my invention will appear in connection with the detailed description thereof and the novel features embodied in my inventive idea will be particularly pointed out in the claims.

In the accompanying drawings which illustrate the application of my invention in one form,—

Figure 1 is a top plan view. Fig. 2 is a view in cross-section on the line 2—2 of Fig. 1 looking in the direction of the arrows. Fig. 3 is a detail view in section on the line 3—3 of Fig. 1. Fig. 4 is a side elevational view of the rear of the device looking toward the left in Fig. 1.

Referring to the particular construction illustrated in the drawings, 10 and 12 designate two side members shown as angle beams which are connected together by the front and rear transverse bars 14 and 16 respectively.

The front bar 14 is much longer than the rear bar 16, so that the beams 10 and 12 converge as they extend toward the rear. The bars 14 and 16 have their ends bent downwardly at an obtuse angle, as best shown in Fig. 2, so that the beams 10 and 12 incline inwardly in a downward direction. Steel blades 18 and 20 are bolted to the flat surfaces of the beams 10 and 12 so as to have the same inclination as the latter, and the front ends of these blades are beveled. A drawbar 22 is secured to the front of the drag by chains 24 and 26 and this drawbar serves as a means of attachment for pulling the drag in any suitable manner. An auxiliary toothed drag is attached at the rear of the main drag or scraper by chains 28 and 30. This auxiliary drag has a V-shaped frame with the side members 32 and 34 converging at the same angle as the beams 10 and 12 and this auxiliary drag is provided with a plurality of teeth 36 secured to the side members.

The operation and advantages of my invention will be readily understood from the foregoing description. The road drag is pulled by any suitable power by hitching to the drawbar 22. The device in passing over a road not only smoothes and levels the surface thereof but takes the gravel and sand which washes to the side of the road and carries such material back toward the center. The material instead of being left in the form of a ridge is distributed by the toothed drag, which also serves to break up any lumps which are of considerable size. On account of the blades being inclined inwardly a much more efficient scraping action is obtained than would otherwise be the case whereby the high places are planed off and the ruts filled. On account of the manner of attaching the side beams to the ends of the transverse bars the blades carried by the beams are held securely and rigidly in the proper inclined position.

I claim:

1. A road drag comprising side members which converge as they extend from the front to the rear, transverse bars secured at their ends to said members, the ends of said bars being inclined downwardly at an obtuse angle, whereby said members are inclined inwardly, and blades secured to the inclined sides of said members.

2. A road drag comprising side members which converge as they extend from the front to the rear, transverse bars secured at their ends to said members, the ends of said bars being inclined downwardly at an obtuse angle, whereby said members are inclined inwardly, blades secured to the inclined sides of said members, and a V-shaped toothed drag attached to the rear of said members, the sides of said drag converging rearwardly at substantially the same angle as said members.

In testimony whereof I hereunto affix my signature.

GLENN H. ALLYN.